United States Patent
Preissl et al.

(10) Patent No.: US 7,030,322 B2
(45) Date of Patent: Apr. 18, 2006

(54) COVER DEVICE FOR LINES IN VEHICLES

(75) Inventors: Reinhold Preissl, Stuttgart (DE);
Volker Burkhardt, Schwaebisch Gmuend (DE); Kiriakos Karampatziakis, Stuttgart (DE); Heribert Uhl, Weil der Stadt (DE); Klaus Winitzki, Remchingen (DE); Hermann Glas, Backnang (DE); Rupert Auer, Germaringen (DE)

(73) Assignee: Robert Bosch GmbH, Stuttgart (DE)

(*) Notice: Subject to any disclaimer, the term of this patent is extended or adjusted under 35 U.S.C. 154(b) by 338 days.

(21) Appl. No.: 10/258,921

(22) PCT Filed: Apr. 26, 2001

(86) PCT No.: PCT/DE01/01584

§ 371 (c)(1),
(2), (4) Date: Mar. 27, 2003

(87) PCT Pub. No.: WO01/83254

PCT Pub. Date: Nov. 8, 2001

(65) Prior Publication Data

US 2003/0156397 A1 Aug. 21, 2003

(30) Foreign Application Priority Data

Apr. 28, 2000 (DE) .............................. 100 21 064

(51) Int. Cl.
*B62D 25/14* (2006.01)
*H02G 3/22* (2006.01)

(52) U.S. Cl. ............................. 174/138 R; 174/72 A; 296/70; 296/901.01; 361/690; 439/34

(58) Field of Classification Search ............... 174/52.1, 174/68.1, 72 A, 72 C, 96, 98, 135, 137 R, 174/138 R, 138 F; 264/1.28, 249; 296/70, 296/901.01; 361/690, 719; 439/34
See application file for complete search history.

(56) References Cited

U.S. PATENT DOCUMENTS

| | | | | |
|---|---|---|---|---|
| 4,942,499 A * | 7/1990 | Shibata et al. | ............... | 361/826 |
| 4,950,168 A * | 8/1990 | Watanabe et al. | ............. | 439/34 |
| 5,040,990 A * | 8/1991 | Suman et al. | ................. | 439/34 |
| 5,309,634 A * | 5/1994 | Van Order et al. | ........... | 29/863 |
| 5,442,518 A * | 8/1995 | Beam | ......................... | 361/690 |
| 5,671,122 A * | 9/1997 | Schoettl et al. | ............. | 361/715 |
| 5,705,104 A | 1/1998 | Trublowski et al. | | |
| 5,715,140 A * | 2/1998 | Sinkunas et al. | ........... | 361/690 |
| 5,754,398 A | 5/1998 | Glovatsky et al. | | |
| 6,048,020 A * | 4/2000 | Gronowicz et al. | ........... | 296/70 |
| 6,095,272 A * | 8/2000 | Takiguchi et al. | ............. | 180/90 |
| 6,257,897 B1 * | 7/2001 | Kubota | ........................ | 439/34 |
| 6,273,499 B1 * | 8/2001 | Guyon | ........................ | 296/214 |
| 6,390,841 B1 * | 5/2002 | Zaguskin | ..................... | 439/248 |
| 6,447,301 B1 * | 9/2002 | Hayashi | ........................ | 439/34 |

(Continued)

FOREIGN PATENT DOCUMENTS

DE 35 34 653 4/1986

(Continued)

*Primary Examiner*—Dean A. Reichard
*Assistant Examiner*—Adolfo Nino
(74) *Attorney, Agent, or Firm*—Kenyon & Kenyon

(57) ABSTRACT

A covering device for the interior of a motor vehicle protects an occupant from coming in contact with the supply lines installed in the vehicle, electric lines being situated as film conductors between two layers of the covering device. This permits simple assembly of a cockpit module in particular in a motor vehicle.

13 Claims, 2 Drawing Sheets

U.S. PATENT DOCUMENTS 6,462,279 B1 * 10/2002 Serizawa et al. .......... 174/72 A
6,505,876 B1 * 1/2003 Watanabe .................... 296/70
6,550,835 B1 * 4/2003 Davis et al. ............. 296/37.12
6,621,688 B1 * 9/2003 Burdick ...................... 361/627
6,669,273 B1 * 12/2003 Glovatsky et al. ..... 296/193.02
6,669,501 B1 * 12/2003 Serizawa et al. ........... 439/422
6,696,669 B1 * 2/2004 Hembree et al. ........... 219/209
6,799,786 B1 * 10/2004 Hein .......................... 296/70

FOREIGN PATENT DOCUMENTS

EP           0 904 986           3/1999

* cited by examiner

COVER DEVICE FOR LINES IN VEHICLES

BACKGROUND INFORMATION

The present invention is directed to a covering device in a motor vehicle according to the preamble of the main claim. It is already known that power supply lines, in particular electric lines, may be shielded from a user of a vehicle by suitable covers. In motor vehicles, a cockpit module made of a plastic material is generally used for this purpose in an area in front of the driver and passenger. This cockpit module has a bushing for the steering column. Furthermore, electric components, e.g., a display unit, a radio or a navigation system may be inserted into openings or cutouts through the cockpit module. The individual devices are connected to a power supply and to data lines on the side of the cockpit module facing away from a user. These lines are preferably bundled in a cable harness which is routed into the engine compartment of the vehicle. Electric circuits are provided on the side of the covering device, designed as a cockpit module, facing away from a user of the vehicle. The electric circuits and cables are inserted into the cockpit module in numerous assembly steps during manufacture. It is also known that electric lines should not be situated loosely behind the covering device, but instead should be mounted on the rear side of the cockpit module.

ADVANTAGES OF THE INVENTION

The covering device according to the present invention having the features of the main claim has the advantage over the related art that electric connecting lines to electric components situated in the covering device may be integrated directly during the manufacture of the covering device. It is therefore possible to eliminate numerous loose cable connections, which require a great deal of space and numerous fastening elements behind the covering device. In addition, it eliminates the installation steps required for installation of the cable connections. Another advantage is that the film conductors are better protected from corrosion and cable breakage due to the layers of the covering device in comparison with a loose cable routing. In addition, it is advantageous that electric terminals on the covering device need not be situated in locations predetermined by the design of the covering device, but instead these terminals may be provided at a central location on the covering device, for example. This simplifies the assembly of the connecting cables, in particular due to the fact that such terminals are now situated in a readily accessible location on the covering device. The elimination of cables may also reduce the weight of the vehicle, and thus the consumption of fuel. Furthermore, the number of plugs to be installed may also be reduced.

Advantageous refinements of and improvements on the covering device characterized in the main claim are possible through the measures characterized in the subclaims. It is especially advantageous to provide recesses for a circuit board in a first layer of the covering device. Depending on the equipment of the vehicle, different circuit boards may be placed in these recesses during installation. No additional mounts are needed for the circuit boards.

In addition, it is advantageous that electric components are placed on the film conductors contacting them electrically. This at least partially eliminates the assembly of circuit boards.

It is also advantageous to provide a switch between the layers of the covering device, preferably operable from a vehicle compartment. Therefore, no additional opening in the covering device is necessary for the arrangement of operating elements relative to the vehicle interior compartment, so the switch is flush with the surface of the covering device without any interspaces into which dirt, for example, could penetrate.

It is especially advantageous to equip a cockpit module in a vehicle with a covering device according to the present invention, because a plurality of electric lines and circuit boards must be situated in such a cockpit module in particular.

DRAWINGS

Exemplary embodiments of the present invention are illustrated in the drawing and described in greater detail in the following description.

DESCRIPTION OF THE EXEMPLARY EMBODIMENT

The covering device according to the present invention may be used in a plurality of vehicles, e.g., motor vehicles, aircraft or rail vehicles. It may be used in the driver's area or in a passenger area and/or a cargo area of the particular vehicle. The exemplary embodiment is described here on the basis of use in a motor vehicle. The covering device may be used in a motor vehicle for use in a cockpit module or for covering lateral surfaces, i.e., vehicle doors, with respect to the interior of the vehicle, with electric lines also running in the lateral surfaces, e.g., for an electric exterior mirror or an air-conditioning system, e.g., in the arrangement of electric window lift motors or control elements for an electric mirror, etc. The covering device according to the present invention is explained in greater detail on the basis of an exemplary embodiment of a cockpit module, i.e., on the basis of sections of a cockpit module.

Figure 1:
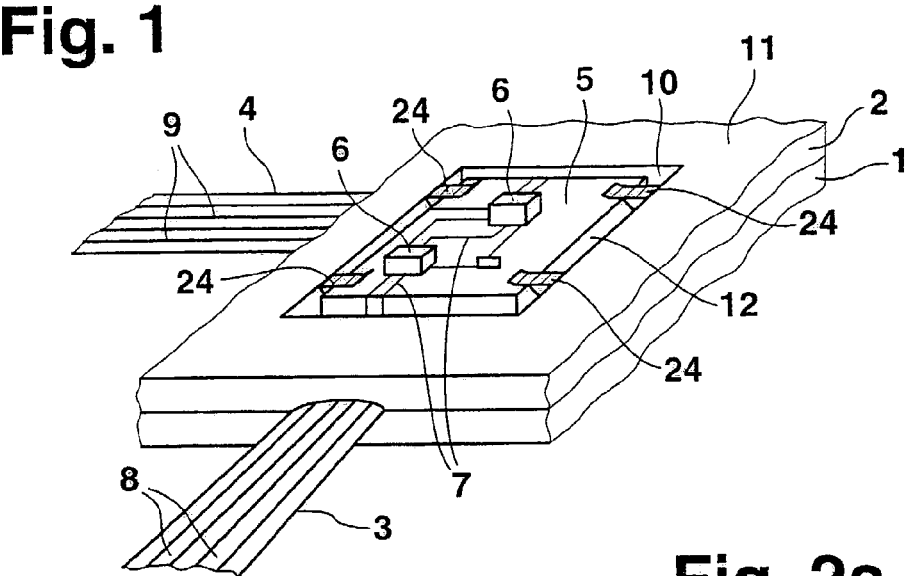
FIG. 1 shows a detail of a covering device according to the present invention having a circuit board situated on the covering device.

FIG. 1 shows a view of a covering device according to the present invention. The covering device has a first layer 1 and a second layer 2. A first film conductor 3 and a second film conductor 4 are situated between first layer 1 and second layer 2. In FIG. 1, first film conductor 3 and second film conductor 4 have been shown as projecting out of the limited area shown of first layer 1 for the sake of better illustration, so that film conductors 3, 4, enclosed between the first and second layers, are discernable. First film conductor 3 and second film conductor 4 lead to a circuit board 5. Circuit board 5 has components 6 and conductors 7 by which components 6 are connected at least in part to one another and/or to first and/or second film conductors 3, 4. Conductors 7 here are connected to conductors 8, 9 situated on film conductors 3, 4. Circuit board 5 is situated in a recess 10 in second layer 2. Recess 10 is preferably situated in a surface 11 of second layer 2, so that circuit board 5 having electric components 6 has little or no elevation above second layer 2. Second layer 2 is preferably made of a plastic material which resists bending, second layer 2 being molded into the shape of the covering device. Shaping of the covering device is not limited exclusively to the planar embodiment of second layer 2 illustrated in FIG. 1. Second layer 2 may also be shaped with a curvature to permit an adaptation to any desired design of the covering device, e.g., to shape it into a rear shelf or a glove compartment in a vehicle. Second layer 2 faces away from the interior of the vehicle, so that surface 11 of second layer 2 is not visible for an occupant of the vehicle sitting in the vehicle. Second layer 2 is covered by first layer 1 with respect to the interior of the vehicle. The interior of the vehicle is preferably the compartment of the vehicle provided for passengers or cargo. First layer 1 is preferably made of a soft plastic material, preferably being foamed onto the second layer, film conductors 3, 4 preferably being enclosed by second layer 2, except for the contact surfaces leading out of them, and thereby secured. Circuit board 5 is then mountable in recess 10 of second layer 2. Circuit board 5 is therefore preferably made of the same plastic material as second layer 2. Circuit board 5 is preferably connected to other circuit boards or plugs (not shown in FIG. 1) via film conductors 3, 4. Electric components 6, which are situated on circuit board 5, are preferably applied to circuit board 5 by SMD technology. Circuit board 5 itself is an electric circuit which is used for controlling a display unit, for example, for readout of operating elements, for navigation of the vehicle, for radio control, and/or climate control in the vehicle. Circuit board 5 having corresponding electric components 6 may be used after creating second layer 2 and first layer 1, depending on the desired embodiment, e.g., in an embodiment which expands or restricts the scope of function of the corresponding device.

In a preferred exemplary embodiment, the circuit board has a gap 12 relative to surface 11 of second layer 2, which permits thermal expansion of circuit board 5 and prevents the resulting stresses due to thermal expansion of the circuit board or second layer 2. In a first embodiment, the circuit board is mounted by attaching it by soldering or gluing with a conductive adhesive. In another embodiment, mounting of circuit board 5 with catch hooks 24 is also possible; these hooks secure the circuit board with respect to first layer 1 and contact surfaces of the film conductors situated thereon (not shown in FIG. 1). The catch hooks are preferably designed as elastic catch hooks which permit simple installation and simple replacement of circuit board 5 and are integrally molded onto second layer 2. Furthermore, however, it is also possible to insert circuit board 5 into recess 10 so that it fits precisely. In another exemplary embodiment (not shown in FIG. 1) it is possible to place electric components 6 directly on surface 11 of second layer 2 and to establish an electric contact through second layer 2 to film conductors 3, 4, e.g., through a borehole or some other orifice passing through second layer 2.

Figure 2A:
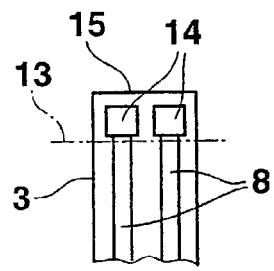
FIG. 2a shows a film conductor having contact surfaces for electric contact with a circuit board.
Figure 2B:
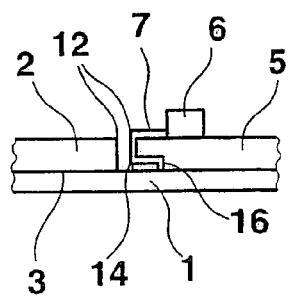
FIG. 2b shows a film conductor in electric contact with a circuit board in a side view.

FIG. 2a shows first film conductor 3 together with conductors 8. As used here and below, the same reference numbers also denote the same elements. Broken line 13 demarcates an edge of surface 11 of second layer 2. An area 15 of first film conductor 3 projects into recess 10 illustrated in FIG. 1. Contact surfaces 14 of conductors 8 are situated on first film conductor 3 in area 15. In a preferred exemplary embodiment, first film conductor 3 is designed so that conductors 8 are embedded in a flexible plastic layer and are electrically insulated from the environment by the flexible plastic layer. Conductors 8 are free of insulation on contact surfaces 14. FIG. 2b shows the area of contacting of circuit board 5 to first film conductor 3 in a side view. A contact 16 is created between a conductor 7 and a contact surface 14 of a conductor 8 of first film conductor 3. In a preferred exemplary embodiment, this connection is established by SMD soldering technique. Furthermore, contact 16 may also be established by using a conductive adhesive. In a preferred exemplary embodiment, contact 16 is created by using a ball-grid array, where small balls of an easily fusible metal alloy are applied to contact surfaces 14 and are contacted by heating to circuit board 5 and conductors 7 situated on the circuit board. Furthermore, the contact may also be established by spring contacts, in which case conductors 7 of circuit board 5 end in contact springs which press against contact surfaces 14 of first film conductor 3. Furthermore, an embodiment having plug contacts is also possible, in which case plug contacts are situated on the film conductor and on circuit board 5.

Figure 3A:
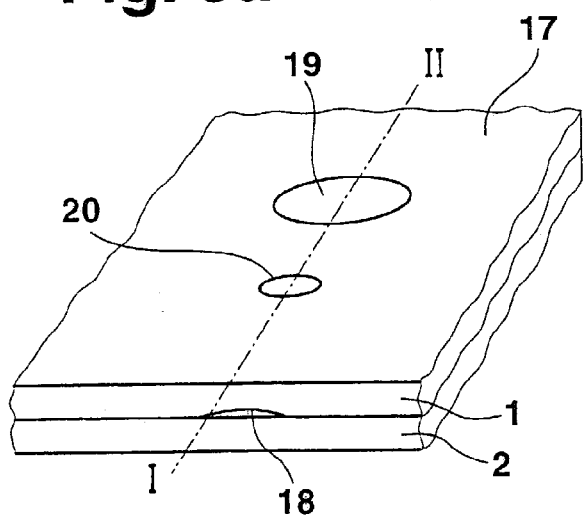
FIG. 3a shows a detail of a covering device according to the present invention having a switch and a light source.
Figure 3B:
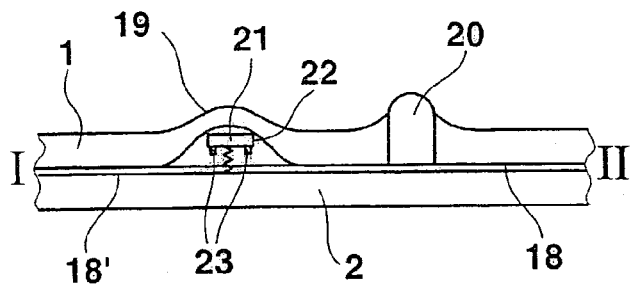
FIG. 3b shows the detail of the covering device according to the present invention from FIG. 3a in a side view.

FIG. 3a shows another detail of a covering device according to the present invention. An elevation 19 having a switch, which is not visible in the diagram in FIG. 3a and is situated in elevation 19, is provided on a surface 17 of first layer 1. In addition to elevation 19, a light source 20 is also provided. The switch situated beneath elevation 19 and light source 20 are connected by a film conductor 18, 18' to a power supply (not shown in FIG. 3a) and to an electric triggering unit. Elevation 19 is preferably colored so that a user can recognize the special functions of elevation 19. FIG. 3b shows a section in a side view along the line from I to II in FIG. 3a. A switch designed as a film switch in which a pushbutton element 21 may be moved against the tension of a spring 22 by pressing on elevation 19, thereby closing a contact between to interrupted conductor segments 18 and 18' of the film conductor through electrically connected contacts 23 of the pushbutton element 21, is provided beneath elevation 19. In another exemplary embodiment (not shown in FIG. 3b), the switch may also be designed as a preferably capacitive switch which responds to the proximity of a finger to elevation 19. The switch composed of pushbutton element 21, spring 22, and electric contacts 23 is completely shielded from the interior of the vehicle by first layer 1. In addition to the switch, a light source 20, preferably an LED or an incandescent lamp, is situated pushing through first layer 1. Light source 20 is contacted directly on film conductor 18 and is supplied with an operating voltage from film conductor 18 over corresponding conductors situated in film conductor 18 and coming from a voltage source (not shown in the figure).

Figure 4A:
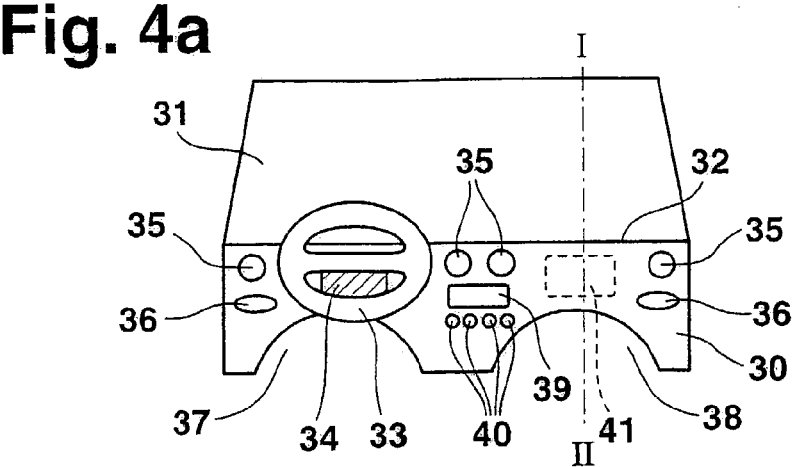
FIG. 4a shows a view of a cockpit module in a motor vehicle according to the present invention having a covering device.

FIG. 4a shows a view of a cockpit module 30 in a motor vehicle. Cockpit module 30 has a covering device having a first layer and a second layer and film conductors arranged between them. Cockpit module 30 is connected to a lower edge 32 of a windshield 31. The cockpit module is also punctured by a steering column (not shown in FIG. 4a) which is connected to a steering wheel 33. In the area of steering wheel 33, a display instrument 34, preferably for displaying at least a vehicle speed, is situated in front of a driver. Furthermore, outlet nozzles 35 for ventilation and/or an air conditioning system are provided in cockpit module 30. Furthermore, storage compartments 36 are also provided in cockpit module 30. Cockpit module 30 encloses a foot space 37 of a driver and foot space 38 of a passenger. In the area of a central console, a display unit 39 together with operating elements 40 is situated between foot space 37 of the driver and foot space 38 of the passenger. An airbag device 42 for a passenger is situated behind a detachable area 41 (shown with broken lines in the figure) of first layer 1 on the side of first layer 1 facing away from the passenger.

Figure 4B:
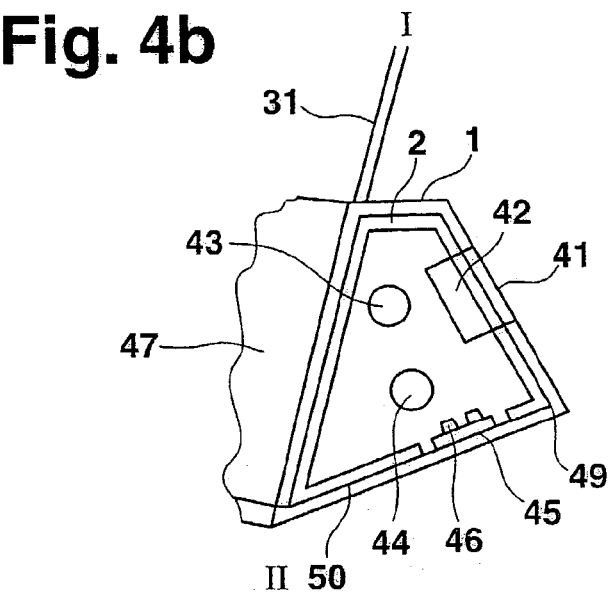
FIG. 4b shows a section through the cockpit device according to the present invention in a side view.

Cockpit module 30 protects the driver and the passenger from power supply lines situated behind the covering device of cockpit module 30 designed according to the present invention. Electric elements, e.g., display unit 39, display instrument 34 and operating elements 40, are connected by film conductors situated between a first layer 1 and a second layer 2 of cockpit module 30. FIG. 4b shows a section through cockpit module 30 along the broken line from I to II in FIG. 4a. An airbag device 42, an air supply line 43 and a supporting element 44 are situated in cockpit module 30. To control the airbag device, a circuit board 45 having components 46 is provided on the side of first layer 1 facing away from the passenger and are connected to airbag device 42 by a film conductor 49. Circuit board 45 may be supplied with electric voltage from an engine compartment 47, preferably from a battery (not shown in the figure) via a film conductor 50. Air supply line 43 leads to an outlet nozzle 35. Supporting element 44 stabilizes the vehicle body.

Figure 5:
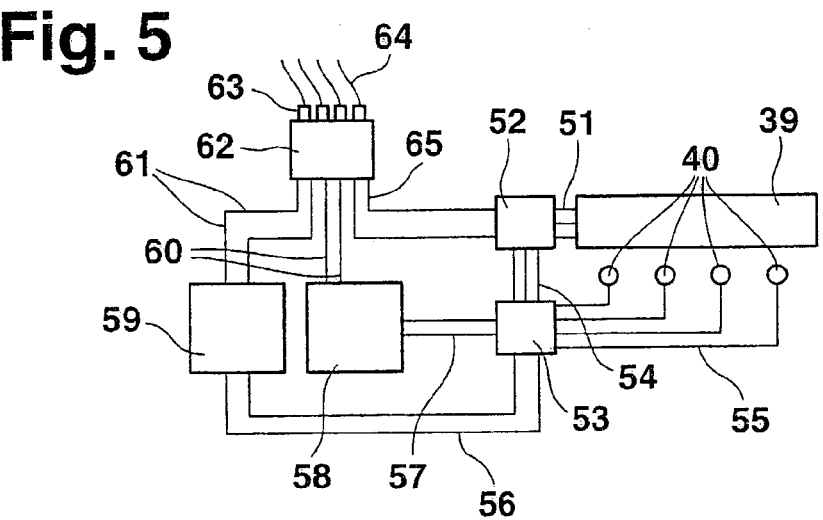
FIG. 5 shows an arrangement of circuit boards, operating elements and display elements in a cockpit module according to the present invention.

FIG. 5 shows an exemplary embodiment of a circuit of circuit boards in cockpit module 30. Display unit 39 passes through first layer 1 and is readable by a user. None of the other elements shown in FIG. 5 is visible to an occupant in the interior of the vehicle. Display unit 39 is connected to a triggering unit 52 of display unit 39 via film conductors 51. Triggering unit 52 is connected to an input and output unit 53 via film conductors 54, input and output unit 53 analyzing the operation of operating elements 40 to which input and output unit 53 is connected by film conductors 55. Operating elements 40 are preferably designed as an elevation 19 above first layer 1 similar to the switch illustrated in FIG. 3a. Input and output unit 53 is connected to a car radio device 58 and a navigation device 59 via film conductors 56, 57. Car radio device 58 controls a car radio (not shown in detail in FIG. 5). Navigation device 59 determines an optimum trip route from a start to a destination according to entries made by a user. To do so, navigation device 59 requires position information and map information. Car radio device 58 requires an antenna input signal. Data for navigation device 59 and car radio device 58 is sent via film conductors 60, 61 from a central plug device 62 of cockpit module 30 to navigation device 59 and car radio device 58. Cables 64 are provided on central plug device 62 together with individual plug connections 63, these cables in turn being connected to the power supply, e.g., the vehicle battery and also being used to supply data, e.g., data from a GPS unit (GPS global positioning system) for a position determination, data from a central memory unit where a digital road map for a vehicle navigation and/or data for radio reception from an antenna device are stored. Central plug device 62 is connected in particular to triggering unit 52 for display unit 39 for power supply via film conductors 65. Display data of car radio device 58, e.g., of the selected station, or display data of the navigation device, e.g., driving instructions, is output by using input and output device 53, which relays corresponding outputs to triggering unit 52 of display unit 39, where the output is displayed. Operating elements 40 are used in particular for a menu selection from a plurality of commands and/or information available in display unit 39. Car radio device 58, navigation device 59, triggering unit 52 as well as input and output unit 53 are preferably designed on circuit boards which may be situated in any desired location in cockpit module 30. Central plug device 62 is preferably situated at a location in the vehicle which is readily accessible, so that in the case of a replacement, e.g., of the vehicle antenna for the radio reception, the corresponding component, e.g., the vehicle antenna, may be replaced by simply releasing a corresponding plug of plug connections 63.

What is claimed is:

1. A covering device in a vehicle that covers at least one of supply lines and electric circuits, the covering device comprising:
   a first layer;
   a second layer;
   a film conductor arranged between the first layer and the second layer; an electric switch arranged between the first layer and the second layer, the electric switch being connected to the film conductor and triggerable through one of the first layer and the second layer; and
   a circuit board that is mountable on the first layer in a recess in the second layer, electric components being arranged on the circuit board.

2. The covering device of claim 1, wherein electric components are arranged on the film conductor so that they are electrically contacted.

3. The covering device of claim 1, wherein the second layer faces away from an interior of the vehicle and is made of a largely inflexible plastic material and the first layer faces the interior of the vehicle and is made of a soft plastic material, the second layer supporting the covering device.

4. The covering device of claim 1, wherein the film conductor is attachable between the first layer and the second layer by enclosing the film conductor in foam using a plastic material.

5. A covering device in a vehicle that covers at least one of supply lines and electric circuits, the covering device comprising:
   a first layer;
   a second layer;
   a film conductor arranged between the first layer and the second layer; and
   a circuit board that is in direct contact with and mountable on the first layer in a recess in the second layer, electric components being arranged on the circuit board.

6. The covering device of claim 5, wherein the circuit board is mountable via catch hooks arranged in the recess.

7. The covering device of claim 5, wherein conductors arranged on the circuit board are connected to contacts of the film conductor via one of ball-grid array technology, SMD technology, and a conductive adhesive.

8. The covering device of claim 5, wherein electric components are arranged on the film conductor so that they are electrically contacted.

9. A cockpit module in a vehicle, comprising:
   a first layer;
   a second layer, the first layer and the second layer forming a protective covering;
   a film conductor arranged between the first layer and the second;
   electric lines protected from a vehicle interior compartment by the protective covering; and
   a circuit board that is in direct contact with and mountable on the first layer in a recess in the second layer, electric components being arranged on the circuit board.

10. The cockpit module of claim 9, further comprising:
    a film conductor connect to the circuit board.

11. The cockpit module of claim 9, further comprising:
an electric terminal provided on the film conductor.

12. A covering device in a vehicle that covers at least one of supply lines and electric circuits, the covering device comprising:
- a first layer;
- a second layer;
- a film conductor arranged between the first layer and the second layer;
- a circuit board that is mountable on the first layer in a recess in the second layer, electric components being arranged on the circuit board; and
- a light source in direct contact with the film conductor.

13. The covering device of claim 12 wherein the light source is a light emitting diode.

* * * * *

UNITED STATES PATENT AND TRADEMARK OFFICE
CERTIFICATE OF CORRECTION

| | | |
|---|---|---|
| PATENT NO. | : 7,030,322 B2 | |
| APPLICATION NO. | : 10/258921 | |
| DATED | : April 18, 2006 | |
| INVENTOR(S) | : Reinhold Preissl et al. | |

It is certified that error appears in the above-identified patent and that said Letters Patent is hereby corrected as shown below:

On the Title page item (57) Abstract, line 3, change "being situated" to --being arranged--

On the Title page item (57) Abstract, line 5, change "permits simple assembly" to --facilitates assembly--

Column 1, line 3, change "BACKGROUND INFORMATION" to --FIELD OF THE INVENTION--

Column 1, line 5, change "is directed to" to --relates to--

Column 1, line 6, change "a motor vehicle according to the preamble of the main claim." to --a motor vehicle.--

Column 1, line 7, change "It is already known that lines, in particular" to --Conventional lines, e.g.,--

Column 1, line 11, change "This cockpit module has" to --This cockpit module includes--

Column 1, line 17, change "These lines are preferably" to --These lines may be--

Column 1, line 20, change "designed as" to --configured as--

Column 1, lines 23-24, change "It is also known that" to --Conventional--

Column 1, line 24, change "situated loosely" to --arranged loosely--

Column 1, line 27, change "ADVANTAGES OF THE INVENTION" to --SUMMARY OF THE INVENTION--

Column 1, line 30, change "The covering device" to --A covering device--

Column 1, lines 31-32, change "having the features of the main claim has the advantage over the related art" to --may provide--

UNITED STATES PATENT AND TRADEMARK OFFICE
CERTIFICATE OF CORRECTION

| | |
|---|---|
| PATENT NO. | : 7,030,322 B2 |
| APPLICATION NO. | : 10/258921 |
| DATED | : April 18, 2006 |
| INVENTOR(S) | : Reinhold Preissl et al. |

It is certified that error appears in the above-identified patent and that said Letters Patent is hereby corrected as shown below:

Column 1, line 33, change "components situated in" to --components arranged in--

Column 1, line 38, change "it eliminates" to --it may eliminate--

Column 1, lines 39-40, change "Another advantage is that the" to --The--

Column 1, line 40, change "conductors are" to --conductors may be--

Column 1, lines 42-43, delete "it is advantageous that"

Column 3, line 3, change "conductors 8, 9 situated" to --conductors 8, 9 arranged--

Column 3, line 4, change "board 5 is situated" to --board 5 is arranged--

Column 3, line 5, change "is preferably situated" to --may be arranged--

Column 3, line 6, change "board 5 having" to --board 5 including--

Column 3, line 8, change "is preferably made" to --may be made--

Column 3, line 11, change "the planar embodiment" to --the planar shape--

Column 3, line 14, change "desired design" to --desired configuration--

Column 3, line 20, change "is preferably" to --may be--

Column 3, line 21-22, change "is preferably" to --may be--

Column 3, line 22, change "preferably being" to --e.g., is--

Column 3, line 27, change "board 5 is therefore preferably made" to --board 5 may therefore be made--

Column 3, line 28-29, change "is preferably connected" to --may be connected--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 3, line 31, change "which are situated" to --which are arranged-- and change "are preferably applied" to --may be applied--

Column 3, line 36, change "board 5 having" to --board 5 including--

Column 3, line 38-39, change "the desired embodiment" to --the desired exemplary embodiment--

Column 3, line 42, change "has a gap 12" to --includes a gap 12--

Column 3, line 45, change "a first embodiment" to --a first exemplary embodiment--

Column 3, line 47, change "another embodiment" to --another exemplary embodiment--

Column 3, line 50, change "situated thereon" to --arranged thereon--

Column 3, line 51-52, change "are preferably designed" to --may be configured--

Column 3, line 52, change "which permit simple" to --which facilitate--

Column 3, line 53, change "and simple replacement of" to --and replacement of--

Column 3, line 67, change "are situated" to --are arranged--

Column 4, line 1, change "In a preferred" to --In an--

Column 4, line 2, change "conductor 3 is designed" to --conductor 3 is configured--

Column 4, line 9, change "In a preferred" to --In an--

Column 4, line 12, change "In a preferred" to --In an--

Column 4, line 16, change "situated on the" to --arranged on the--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 4, line 20, change "Furthermore, an" to --Furthermore, an exemplary--

Column 4, line 21, change "having plug contacts" to --including plug contacts--

Column 4, line 22, change "contacts are situated" to --contacts are arranged--

Column 4, line 25, change "An elevation 19 having a" to --An elevation 19 including a--

Column 4, line 27, change "situated in elevation 19," to --arranged in elevation 19,--

Column 4, line 29, change "The switch situated beneath" to --The switch arranged beneath--

Column 4, line 32, change "is preferably colored" to --may be colored--

Column 4, line 35, change "A switch designed" to --A switch configured--

Column 4, change 42, change "may also be designed as" to --may also be configured as--

Column 4, line 43, change "a preferably capacitive switch" to --a capacitive switch--

Column 4, line 44, change "The switch composed of" to --The switch includes--

Column 4, line 47-48, change "preferably an LED" to --e.g., an LED--

Column 4, line 48, change "is situated pushing" to --is arranged pushed--

Column 4, line 52, change "situated in film conductor 18" to --arranged in film conductor 18--

Column 4, line 55, change "Cockpit module 30 has a covering device having" to --Cockpit module 30 includes a covering device including--

UNITED STATES PATENT AND TRADEMARK OFFICE
CERTIFICATE OF CORRECTION

| | |
|---|---|
| PATENT NO. | : 7,030,322 B2 |
| APPLICATION NO. | : 10/258921 |
| DATED | : April 18, 2006 |
| INVENTOR(S) | : Reinhold Preissl et al. |

It is certified that error appears in the above-identified patent and that said Letters Patent is hereby corrected as shown below:

Column 4, line 61, change "preferably for" to --e.g., for--

Column 4, line 62, change "is situated in front" to --is arranged in front--

Column 5, line 2, change "is situated between" to --is arranged between--

Column 5, line 4, change "is situated behind" to --is arranged behind--

Column 5, line 8, change "situated behind" to --arranged behind--

Column 5, line 12, change "situated between" to --arranged between--

Column 5, line 16, change "are situated in" to --are arranged in--

Column 5, line 17, change "circuit board 45 having" to --circuit board 45 including--

Column 5, line 21-22, change "preferably from a battery" to --e.g., from a battery--

Column 5, line 36, change "are preferably designed" to --may be configured--

Column 5, line 49, change "in turn being connected to" to --in turn are connected to--

Column 5, line 50, change "and also being" to --and are also--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 5, line 66, change "are preferably designed" to --may be configured--

Column 6, line 1-2, change "is preferably situated" to --may be arranged--

Column 6, line 5, change "replaced by simply" to --replaced by--

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,030,322 B2 | |
| APPLICATION NO. | : 10/258921 | |
| DATED | : April 18, 2006 | |
| INVENTOR(S) | : Reinhold Preissl et al. | |

It is certified that error appears in the above-identified patent and that said Letters Patent is hereby corrected as shown below:

On the Title of the patent, Item (57) Abstract, line 3, change "being situated" to --being arranged--

On the Title of the patent, Item (57) Abstract, line 5, change "permits simple assembly" to --facilitates assembly--

Column 1, line 3, change "BACKGROUND INFORMATION" to --FIELD OF THE INVENTION--

Column 1, line 5, change "is directed to" to --relates to--

Column 1, line 6, change "a motor vehicle according to the preamble of the main claim." to --a motor vehicle.--

Column 1, line 7, change "It is already known that lines, in particular" to --Conventional lines, e.g.,--

Column 1, line 11, change "This cockpit module has" to --This cockpit module includes--

Column 1, line 17, change "These lines are preferably" to --These lines may be--

Column 1, line 20, change "designed as" to --configured as--

Column 1, lines 23-24, change "It is also known that" to --Conventional--

Column 1, line 24, change "situated loosely" to --arranged loosely--

Column 1, line 27, change "ADVANTAGES OF THE INVENTION" to --SUMMARY OF THE INVENTION--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 1, line 30, change "The covering device" to --A covering device--

Column 1, lines 31-32, change "having the features of the main claim has the advantage over the related art" to --may provide--

Column 1, line 33, change "components situated in" to --components arranged in--

Column 1, line 38, change "it eliminates" to --it may eliminate--

Column 1, lines 39-40, change "Another advantage is that the" to --The--

Column 1, line 40, change "conductors are" to --conductors may be--

Column 1, lines 42-43, delete "it is advantageous that"

Column 1, line 44, change "situated in locations" to --arranged in locations--

Column 1, line 45, change "design of" to --configuration of--

Column 1, line 47, change "This simplifies" to --This facilitates--

Column 1, line 48, change "cables, in particular" to --cables--

Column 1, line 49, change "situated in" to --arranged in--

Column 1, lines 54-57, delete "Advantageous refinements of and improvements on the covering device characterized in the main claim are possible through the measures characterized in the subclaims. It is especially advantageous to provide"

Column 1, line 57, change "recesses for" to --Recesses for--

Column 1, line 58, change "in a first layer" to --may be provided in a first layer--

UNITED STATES PATENT AND TRADEMARK OFFICE
CERTIFICATE OF CORRECTION

| | |
|---|---|
| PATENT NO. | : 7,030,322 B2 |
| APPLICATION NO. | : 10/258921 |
| DATED | : April 18, 2006 |
| INVENTOR(S) | : Reinhold Preissl et al. |

It is certified that error appears in the above-identified patent and that said Letters Patent is hereby corrected as shown below:

Column 1, line 62, change "In addition, it is advantageous that electronic components" to --Electronic components--

Column 1, line 63, change "are placed" to --may be placed--

Column 1, line 66, change "It is also advantageous to provide a switch" to --A switch may be provided--

Column 1, line 67, change "covering device, preferably operable" to --covering device that may be operable--

Column 2, line 7, change "It is especially advantageous to equip a cockpit module" to --A cockpit module may be equipped--

Column 2, line 9, change "invention, because a plurality" to --invention. A plurality--

Column 2, line 10, change "must be situated" to --are arranged--

Column 2, line 10-11, change "cockpit module in particular." to --cockpit module.--

Column 2, line 13, delete "DRAWINGS"

Column 2, line 16-17, change "illustrated in the drawing and described in greater detail in the following description." to --illustrated in the drawings and described in the following description.--

Column 2, line 17, insert heading --BRIEF DESCRIPTION OF THE DRAWINGS:--

Column 2, line 38-39, change "DESCRIPTION OF THE EXEMPLARY EMBODIMENT" to --DETAILED DESCRIPTION--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 2, line 58, change "device has" to --device includes--

Column 2, line 60, change "are situated" to --are arranged--

Column 2, line 62, change "have been shown" to --are shown--

Column 2, line 67, change "board 5 has" to --board 5 includes--

Column 3, line 3, change "conductors 8, 9 situated" to --conductors 8, 9 arranged--

Column 3, line 4, change "board 5 is situated" to --board 5 is arranged--

Column 3, line 5, change "is preferably situated" to --may be arranged--

Column 3, line 6, change "board 5 having" to --board 5 including--

Column 3, line 8, change "is preferably made" to --may be made--

Column 3, line 11, change "the planar embodiment" to --the planar shape--

Column 3, line 14, change "desired design" to --desired configuration--

Column 3, line 20, change "is preferably" to --may be--

Column 3, line 21-22, change "is preferably" to --may be--

Column 3, line 22, change "preferably being" to --e.g., is--

Column 3, line 27, change "board 5 is therefore preferably made" to --board 5 may therefore be made--

Column 3, line 28-29, change "is preferably connected" to --may be connected--

UNITED STATES PATENT AND TRADEMARK OFFICE
CERTIFICATE OF CORRECTION

PATENT NO.       : 7,030,322 B2
APPLICATION NO.  : 10/258921
DATED            : April 18, 2006
INVENTOR(S)      : Reinhold Preissl et al.

It is certified that error appears in the above-identified patent and that said Letters Patent is hereby corrected as shown below:

Column 3, line 31, change "which are situated" to --which are arranged-- and change "are preferably applied" to --may be applied--

Column 3, line 36, change "board 5 having" to --board 5 including--

Column 3, line 38-39, change "the desired embodiment" to --the desired exemplary embodiment--

Column 3, line 42, change "has a gap 12" to --includes a gap 12--

Column 3, line 45, change "a first embodiment" to --a first exemplary embodiment--

Column 3, line 47, change "another embodiment" to --another exemplary embodiment--

Column 3, line 50, change "situated thereon" to --arranged thereon--

Column 3, line 51-52, change "are preferably designed" to --may be configured--

Column 3, line 52, change "which permit simple" to --which facilitate--

Column 3, line 53, change "and simple replacement of" to --and replacement of--

Column 3, line 67, change "are situated" to --are arranged--

Column 4, line 1, change "In a preferred" to --In an--

Column 4, line 2, change "conductor 3 is designed" to --conductor 3 is configured--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 4, line 9, change "In a preferred" to --In an--

Column 4, line 12, change "In a preferred" to --In an--

Column 4, line 16, change "situated on the" to --arranged on the--

Column 4, line 20, change "Furthermore, an" to --Furthermore, an exemplary--

Column 4, line 21, change "having plug contacts" to --including plug contacts--

Column 4, line 22, change "contacts are situated" to --contacts are arranged--

Column 4, line 25, change "An elevation 19 having a" to --An elevation 19 including a--

Column 4, line 27, change "situated in elevation 19," to --arranged in elevation 19,--

Column 4, line 29, change "The switch situated beneath" to --The switch arranged beneath--

Column 4, line 32, change "is preferably colored" to --may be colored--

Column 4, line 35, change "A switch designed" to --A switch configured--

Column 4, line 42, change "may also be designed as" to --may also be configured as--

Column 4, line 43, change "a preferably capacitive switch" to --a capacitive switch--

Column 4, line 44, change "The switch composed of" to --The switch includes--

UNITED STATES PATENT AND TRADEMARK OFFICE
CERTIFICATE OF CORRECTION

| | | |
|---|---|---|
| PATENT NO. | : 7,030,322 B2 | |
| APPLICATION NO. | : 10/258921 | |
| DATED | : April 18, 2006 | |
| INVENTOR(S) | : Reinhold Preissl et al. | |

It is certified that error appears in the above-identified patent and that said Letters Patent is hereby corrected as shown below:

Column 4, line 47-48, change "preferably an LED" to --e.g., an LED--

Column 4, line 48, change "is situated pushing" to --is arranged pushed--

Column 4, line 52, change "situated in film conductor 18" to --arranged in film conductor 18--

Column 4, line 55, change "Cockpit module 30 has a covering device having" to --Cockpit module 30 includes a covering device including--

Column 4, line 61, change "preferably for" to --e.g., for--

Column 4, line 62, change "is situated in front" to --is arranged in front--

Column 5, line 2, change "is situated between" to --is arranged between--

Column 5, line 4, change "is situated behind" to --is arranged behind--

Column 5, line 8, change "situated behind" to --arranged behind--

Column 5, line 12, change "situated between" to --arranged between--

Column 5, line 16, change "are situated in" to --are arranged in--

Column 5, line 17, change "circuit board 45 having" to --circuit board 45 including--

Column 5, line 21-22, change "preferably from a battery" to --e.g., from a battery--

Column 5, line 36, change "are preferably designed" to --may be configured--

UNITED STATES PATENT AND TRADEMARK OFFICE
CERTIFICATE OF CORRECTION

PATENT NO. : 7,030,322 B2
APPLICATION NO. : 10/258921
DATED : April 18, 2006
INVENTOR(S) : Reinhold Preissl et al.

It is certified that error appears in the above-identified patent and that said Letters Patent is hereby corrected as shown below:

Column 5, line 49, change "in turn being connected to" to --in turn are connected to--

Column 5, line 50, change "and also being" to --and are also--

Column 5, line 66, change "are preferably designed" to --may be configured--

Column 6, line 1-2, change "is preferably situated" to --may be arranged--

Column 6, line 5, change "replaced by simply" to --replaced by--

Signed and Sealed this

Second Day of December, 2008

JON W. DUDAS
*Director of the United States Patent and Trademark Office*